US007004854B2

(12) United States Patent
Hogge et al.

(10) Patent No.: US 7,004,854 B2
(45) Date of Patent: *Feb. 28, 2006

(54) GOLF BALL WITH VAPOR BARRIER LAYER AND METHOD OF MAKING SAME

(75) Inventors: Matthew F Hogge, New Bedford, MA (US); Constantine A Kondos, Pittsburgh, PA (US); Christopher Cavallaro, Lakeville, MA (US); Michael D Jordan, East Greenwich, RI (US)

(73) Assignee: Acushnet Company, Fairhavem, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/611,833

(22) Filed: Jul. 1, 2003

(65) Prior Publication Data

US 2004/0048688 A1    Mar. 11, 2004

Related U.S. Application Data

(63) Continuation-in-part of application No. 09/973,342, filed on Oct. 9, 2001, now Pat. No. 6,632,147.

(51) Int. Cl.
    *A63B 37/04*    (2006.01)
(52) U.S. Cl. ..................... 473/374; 473/374
(58) Field of Classification Search .............. 473/351, 473/373, 374, 377
    See application file for complete search history.

(56) References Cited

U.S. PATENT DOCUMENTS

| 2,356,128 | A | 8/1944 | Thomas et al. ............ 260/79 |
| 3,099,644 | A | 7/1963 | Parker et al. ............. 260/85.3 |
| 3,241,834 | A | 3/1966 | Stingley .................... 273/58 |
| 3,313,545 | A | 4/1967 | Bartsch .................... 273/218 |
| 3,642,728 | A | 2/1972 | Canter ..................... 260/79.3 R |
| 3,989,568 | A | 11/1976 | Isaac ....................... 156/182 |
| 4,123,061 | A | 10/1978 | Dusbiber .................. 273/220 |
| 4,165,425 | A | 8/1979 | Bertozzi ................... 528/374 |
| 4,209,485 | A | 6/1980 | Greespan .................. 264/242 |
| 4,229,337 | A | 10/1980 | Brenner ................... 260/32.6 A |
| 4,234,705 | A | 11/1980 | Matoba .................... 525/329 |
| 4,239,799 | A | 12/1980 | Weinberg et al. ........... 428/335 |
| 4,263,078 | A | 4/1981 | Millen et al. .............. 156/244.11 |
| 4,356,676 | A | 11/1982 | Hauptman ................. 52/403 |
| 4,863,167 | A | 9/1989 | Matsuki et al. ............. 273/62 |
| 4,995,613 | A | 2/1991 | Walker .................... 273/183 |
| 5,184,828 | A | 2/1993 | Kim et al. ................. 273/228 |
| 5,468,527 | A | 11/1995 | Peiffer et al. .............. 428/35.7 |
| 5,506,014 | A | 4/1996 | Minnick ................... 428/35.7 |
| 5,605,512 | A | 2/1997 | Yamada et al. ............. 473/354 |
| 5,672,393 | A | 9/1997 | Bachmann et al. .......... 427/493 |
| 5,677,362 | A | 10/1997 | Bachmann et al. .......... 522/28 |
| 5,685,785 | A | 11/1997 | Kakiuchi et al. ........... 473/354 |
| 5,755,628 | A | 5/1998 | Kakiuchi et al. ........... 473/354 |
| 5,779,562 | A | 7/1998 | Melvin et al. .............. 473/373 |
| 5,820,488 | A | * | 10/1998 | Sullivan et al. ............ 473/374 |
| 5,873,796 | A | 2/1999 | Cavallaro et al. ........... 473/365 |
| 5,875,891 | A | 3/1999 | Snell ...................... 206/315.9 |
| 5,882,567 | A | 3/1999 | Cavallaro et al. ........... 264/255 |
| 5,885,172 | A | 3/1999 | Hebert et al. .............. 473/354 |
| 5,908,358 | A | 6/1999 | Wu ........................ 473/378 |
| 5,919,100 | A | 7/1999 | Boehm et al. .............. 473/354 |
| 5,965,669 | A | 10/1999 | Cavallaro et al. ........... 525/221 |
| 5,967,907 | A | * | 10/1999 | Takemura et al. .......... 473/373 |
| 6,010,412 | A | 1/2000 | Moriyama ................. 473/373 |
| 6,030,296 | A | 2/2000 | Morgan et al. ............. 473/361 |
| 6,045,460 | A | 4/2000 | Hayashi et al. ............. 473/376 |
| 6,062,283 | A | 5/2000 | Watanabe et al. ........... 152/510 |
| 6,066,054 | A | 5/2000 | Masutani .................. 473/374 |
| 6,106,415 | A | 8/2000 | Masutani et al. ........... 473/374 |
| 6,113,505 | A | 9/2000 | Boehm .................... 473/357 |
| 6,117,024 | A | 9/2000 | Dewanjee ................. 473/351 |
| 6,123,628 | A | 9/2000 | Ichikawa et al. ........... 473/371 |
| 6,126,558 | A | 10/2000 | Higuchi et al. ............. 473/374 |
| 6,132,324 | A | 10/2000 | Hebert et al. .............. 473/378 |
| 6,135,898 | A | 10/2000 | Higuchi et al. ............. 473/374 |
| 6,142,888 | A | 11/2000 | Higuchi et al. ............. 473/374 |
| 6,174,388 | B1 | 1/2001 | Sikka et al. ............... 148/512 |
| 6,180,715 | B1 | 1/2001 | Schmidt ................... 524/611 |
| 6,200,511 | B1 | 3/2001 | Peiffer et al. .............. 264/176.1 |
| 6,232,389 | B1 | 5/2001 | Feeney et al. .............. 524/450 |
| 6,334,919 | B1 | 1/2002 | Takeyama et al. .......... 156/123 |
| 6,342,567 | B1 | 1/2002 | Minagawa et al. .......... 525/192 |
| 6,346,571 | B1 | 2/2002 | Dharmarajan et al. ....... 525/72 |
| 6,361,453 | B1 | * | 3/2002 | Nakamura et al. .......... 473/371 |
| 6,398,668 | B1 | * | 6/2002 | Wai ....................... 473/374 |
| 6,432,000 | B1 | * | 8/2002 | Nesbitt et al. ............. 473/377 |
| 6,632,147 | B1 | * | 10/2003 | Cavallaro et al. ........... 473/374 |
| 2003/0027667 | A1 | 2/2003 | Sullivan ................... 473/378 |
| 2003/0027669 | A1 | 2/2003 | Sullivan ................... 473/378 |
| 2003/0069085 | A1 | 4/2003 | Hogge et al. .............. 473/371 |
| 2003/0148826 | A1 | * | 8/2003 | Ohama et al. ............. 473/371 |
| 2003/0153406 | A1 | * | 8/2003 | Endo et al. ................ 473/371 |

FOREIGN PATENT DOCUMENTS

| WO | WO 00/23519 | 4/2000 |
| WO | WO 01/29129 | 4/2001 |

* cited by examiner

Primary Examiner—Raeann Gorden

(57) ABSTRACT

A golf ball comprising a core, a barrier layer enveloping the core, and a cover enveloping the barrier layer, wherein the barrier layer has a moisture vapor transmission rate less than that of the cover, and the barrier layer comprises a thermoplastic or thermoset composition of microparticles dispersed in a binder.

48 Claims, No Drawings

GOLF BALL WITH VAPOR BARRIER LAYER AND METHOD OF MAKING SAME

CROSS-REFERENCE TO RELATED APPLICATIONS

This application is a continuation-in-part of U.S. application Ser. No. 09/973,342, filed Oct. 9, 2001 now U.S. Pat. No. 6,632,147, which is incorporated herein in its entirety by express reference thereto.

FIELD OF THE INVENTION

The present invention relates to golf balls, and more particularly to novel compositions and constructions for a golf ball.

BACKGROUND OF THE INVENTION

The United States Golf Association ("USGA") provides five (5) regulations to keep golf balls consistent. Specifically, the golf ball must weight no more than 1.62 ounces and measure no less than 1.68 inches in diameter. The initial velocity of the ball as test on a USGA machine at a set club head speed must not exceed 255 ft/sec. The overall distance of the ball as tested with a USGA specified driver at 160 ft/sec and a 10 degree launch angle must not exceed 296.8 yards. And the ball must pass a USGA administered symmetry test. With these guidelines, one skilled in the art can achieve certain combinations of performance characteristics (such as distance, durability, feel, spin, sound, etc.) through modifications in material compositions, constructions, and surface configurations of various portions of the ball.

Solid core golf balls are well known in the art, which are typically made from polybutadiene rubber materials that, together with high crosslink density, provide the primary source of resiliency for the golf balls. A known drawback of solid cores, such as those based on polybutadiene(s) crosslinked with peroxide and/or zinc diacrylate, is their undesirable sensitivity to and absorption of water vapor and moisture, which reduces core resiliency and degrades other ball properties, such as compression, initial velocity, and coefficient of restitution. Thus, the solid cores are usually encapsulated in a cover to shield them from the invasion of moisture and to maintain optimum ball properties. Conventional cover materials include balata (trans-polyisoprene), ionomer resins, polyurethane, and polyurea, among others. Polyurethane and polyurea covers are generally preferred for their softness, but they exhibit poor moisture barrier properties. Therefore, prolonged exposure to high humidity and elevated temperature poses a particularly significant problem to golf balls of polybutadiene solid core and polyurethane or polyurea cover.

Several prior patents have addressed the water vapor absorption problem. U.S. Pat. No. 5,820,488 discloses a barrier layer having a water vapor transmission rate lower than the cover, formed from polyvinylidene chloride, vermiculite, or a barrier-forming material disposed on the core through an in situ reaction. U.S. Pat. No. 5,875,891 discloses an impermeable packaging that limits moisture absorption by golf balls during storage. U.S. Pat. Nos. 5,885,172 and 6,132,324 disclose thin, hard ionomer-based, inner covers that offer some resistance to water vapor penetration without affecting other ball properties. U.S. Pat. No. 6,232,389 discloses a barrier layer for an air-filled or gas-filled game ball, formed from aqueous solution of an elastomer, a dispersed exfoliated layered filler, and a surfactant. U.S. Pat. No. 6,398,668 discloses an oxygen barrier layer composed of ethylene vinyl alcohol copolymer.

However, there remains a need for other golf balls with an improved barrier layer and improved methods for applying such a barrier layer in the golf ball.

SUMMARY OF THE INVENTION

The present invention is directed to a golf ball comprising a core, a barrier layer enveloping the core, and a cover enveloping the barrier layer, wherein the barrier layer has a moisture vapor transmission rate lower than the cover. The barrier layer is formed of a thermoplastic or thermoset composition comprising microparticles, such as fibers, whiskers, metal flakes, micaceous particles, nanoparticles, or combinations thereof, dispersed in a binder comprising synthetic rubbers, natural rubbers, polyolefins, styrenic polymers, single-cite catalyzed polymers, or combinations thereof. Suitable styrenic polymers include styrene-butadiene copolymers, poly(styrene-co-maleic anhydride), acrylonitrile-butylene-styrene copolymers, styrene-olefin block copolymers, poly(styrene sulfonate), and combinations thereof, with styrene-olefin block copolymers being preferred. Suitable metal flakes (preferably leafing) include aluminum flakes, iron oxide flakes, copper flakes, bronze flakes, and combinations thereof, with aluminum flakes comprising aluminum oxide being preferred. As a means for creating a hydrophobic tortuous path across the barrier layer, the microparticles have a particle size of about 4 microns to about 335 microns, and are present by about 50 phr to about 250 phr by weight of the binder. Preferably, the particle-to-binder weight ratio is about 1 to about 2.

The composition of the barrier layer can incorporate a cross-linking agent and become thermoset. Suitable cross-linking agents include polyolefin polyols, such as hydrogenated polybutadiene polyols, present in an amount of at least about 10 parts, preferably at least about 20 parts, per 100 part by weight of the binder. The composition may further comprise a catalyst, a coupling agent, or both. The coupling agent is used to bind the microparticles to the rubber binder, and/or to bond the barrier layer directly to the underlying substrate (core or layer) and/or the cover or layer disposed over the barrier layer. The barrier layer is preferably thinner than about 0.02 inches, more preferably about 0.001 inches to about 0.01 inches, and most preferably about 0.002 inches to about 0.007 inches.

Formed from these compositions, the barrier layer preferably has a moisture vapor transmission rate of less than about 0.95 grams·mm/(m$^2$·day), more preferably less than about 0.65 grams·mm/(m$^2$·day); a Sward hardness of about 5 to about 20; a pencil hardness of about 5B to about F; and a specific gravity of about 1 g/cm$^3$ to about 1.5 g/cm$^3$, more preferably greater than that of the core by at least about 0.1 g/cm$^3$. Suitable methods to apply the barrier layer include spraying or dipping, where the composition is dispersed in a non-aqueous solvent system comprising aromatic hydrocarbons, ketones, acetates, alcohols, esters, or combinations thereof. This solvent-borne dispersion has a solid content of preferably at least about 15%, more preferably at least about 30%; and a viscosity of preferably about 300 cps to about 1,500 cps.

In a preferred embodiment, the core has a diameter of at least about 1.55 inches, preferably at least about 1.62 inches; the barrier layer has a thickness of less than about 0.02 inches; and the cover has a thickness of less than 0.08 inches, preferably less than about 0.03 inches. The core can be a one-piece solid core formed from a polybutadiene having a Mooney viscosity of greater than about 35, a crosslinking agent in an amount of greater than about 15 parts per 100 parts by weight of the polybutadiene, and an optional plasticizer. The one-piece core preferably has a diameter of about 1.62 inches to about 1.64 inches, a compression of less than about 100, a deflection at 100 kg of greater than about 1.5 mm, a coefficient of restitution of greater than about 0.78, a specific gravity of less than about 1.4 g/cm$^3$, and a peripheral hardness greater than a central hardness by at least about 5 Shore C.

Alternatively, the core comprises a center and an outer core layer enveloping the center. The center is formed from a polybutadiene having a Mooney viscosity of greater than about 35, a crosslinking agent in an amount of about 15 part to about 40 parts per 100 parts by weight of the polybutadiene, a regrind or filler, and an optional plasticizer. The center has a diameter of about 0.5 inches to about 1.6 inches, a compression of about 10 to about 100, and a deflection at 100 kg of greater than about 1.5 mm. The outer core layer, with has a material hardness of greater than about 60 Shore C, is formed from a polybutadiene having a Mooney viscosity of greater than about 35, a crosslinking agent in an amount of about 25 part to about 55 parts per 100 parts by weight of the polybutadiene, a regrind, polyisoprene, or filler, and an optional plasticizer.

The cover preferably comprises a composition formed from a thermoplastic polyurethane, a thermoset polyurethane, a thermoplastic polyurea, or a thermoset polyurea. The cover composition preferably has a material hardness of about 25 Shore D to about 65 Shore D and a flexural modulus of at least about 2,000 psi. The cover has an outermost surface occupied by preferably about 250 to about 450 dimples. The golf ball formed therefrom preferably has a compression of less than about 110, a coefficient of restitution greater than about 0.79, a moment of inertia less than about 84 g·cm$^2$, and a deflection at 100 kg of greater than about 1.5 mm.

DEFINITIONS

As used herein, the term "polyahl" or "reactive polyahl" refers to any one compound or a mixture of compounds containing a plurality of active hydrogen moieties per molecule. Illustrative of such active hydrogen moieties are —OH (hydroxy group), —SH (thio group), —COOH (carboxylic acid group), and —NHR (amine group), with R being hydrogen, alkyl, aryl, or epoxy; all of which may be primary or secondary. These active hydrogen moieties are reactive to free isocyanate groups, forming urethane, urea, thiourea or corresponding linkage depending on the particular active hydrogen moiety being reacted. The polyahls may be monomers, homo-oligomers, co-oligomers, homopolymers, or copolymers. Oligomeric and polymeric polyahls having at least one NCO-reactive group on each terminal of a backbone are typically employed as the soft segment in reaction products such as polyureas and polyurethanes. Depending on the terminal groups, the oligomeric and polymeric polyahls may be identified as polyols (with —OH terminals only), polyamines (with —NHR terminals only), or amino alcohol oligomers or polymers (with both —OH and —NHR terminals). Such polyahls with a relatively low molecular weight (less than about 5,000), and a wide variety of monomeric polyahls, are used as curing agents. The polyahls are generally liquids or solids meltable at relatively low temperatures.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, preferably less than 5. Saturated compounds include compounds that are aliphatic, alicyclic, or fully hydrogenated.

As used herein, the term "percent NCO" or "% NCO" refers to the percent by weight of free, reactive, and unreacted isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" means stress to strain ratio within the elastic limit (measured in flexural mode) of a material, indicates the bending stiffness of the material, and is similar to tensile modulus. Flexural modulus, typically reported in Pascal ("Pa") or pounds per square inches ("psi"), is derived in accordance to ASTM D6272-02.

As used herein, the term "water vapor transmission rate" ("WVTR") refers to the mass of water vapor that diffuses through a material of a given thickness per unit area per unit time at a specific temperature and humidity differential. Standard tests for WVTR include ASTM E96-00, ASTM F1249-90, and ASTM F372-99, among others.

As used herein, the term "aspect ratio" refers to the ratio of a platelet particle's lateral dimension to its thickness. The term "effective aspect ratio" refers to the aspect ratio of flake particles when dispersed in a binder such as a rubber or polymer matrix. Rather than being separated as singular flakes, the flakes may exist in many forms, such as a bundle of tens or hundreds of flakes known as agglomerates. The aspect ratio of the bundle or agglomerate (i.e., the effective aspect ratio), while usually being much lower than that of the single flake, is directly related to the barrier property of the flakes in the binder.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

The term "about," as used herein in connection with one or more numbers or numerical ranges, refers to all such numbers, including all numbers in a range. Because these ranges are continuous, they include any and all values between the minimum and maximum values.

DETAILED DESCRIPTION OF THE INVENTION

Golf ball cores of the present invention may be solid, fluid-filled, or gas-filled, having a one-piece construction, two-piece construction, or multi-piece construction. The core may comprise a center and an outer core layer. The outer core layer may be an integral solid or wound layer, or discrete layers molded or wound onto each other. When two or more wound layers are present, each can be chemically, physically, or mechanically distinct from the others. Wound layer(s) are formed from threads of various sizes and materials including, but not limited to, natural rubber, polyether urea (Lycra® by DuPont), polyester urea, polyester block copolymers (Hytrel® by DuPont), polyethylene, polyamide, polyketone, poly(p-phenylene terephthalamide) (Kevlar® by DuPont), polyisoprene, among others. Wound layers may be wound at different tensions to create a hardness gradient. Suitable fluidic substances usable in fluid-filled cores include aqueous solutions, liquids, gels, rubber based gels, foams, hot-melts, pastes, colloidal suspensions, reactive liquid systems, and the like or combinations thereof. Exemplary fluidic substances include salt in water, corn syrup, glycol, oils, clay, barytes, gelatin gels, hydrogels, methyl cellulose gels, styrene-butadiene-styrene rubber in paraffinic and/or naphthenic oil, waxes, silicate gels, agar gels, peroxide cured polyester resins, epoxy resins, peroxide cured liquid polybutadiene rubbers, reactive polyurethanes or polyureas, silicones and polyesters, SAE 10 oil, SAE 30 oil, methanol, ethanol, ammonia, glycerin, and carbon tetrachloride.

Solid cores are made from suitable core materials known to the skilled in the art, including thermoplastic and thermoset elastomers such as natural rubber, polybutadiene, polyisoprene, styrene-butadiene or styrene-propylene-diene rubber, ionomer resins, polyamides, polyesters, polyurethanes, polyureas, Pebax® from AtoFina Chemicals Inc., Hytrel® from E.I. Du Pont de Nemours and Company, and Kraton® from Shell Chemical Company. The core materials can also be formed from a castable material. Suitable castable materials include polyurethanes, polyureas, epoxies, silicones, interpenetrating polymer networks, and the like. Additionally, suitable core materials may also include a RIM polyurethane or polyurea, preferably the nucleated versions where nitrogen gas is whipped into the reaction mixture prior to injection into a closed mold to form the layer. One skilled in the art understands that other elastomers may be used as the core material without departing from the scope and spirit of the present invention.

Preferred compositions for solid cores include a base rubber, a crosslinking agent, and a free radical initiator. The base rubber typically includes natural or synthetic rubbers. A preferred base rubber is a polybutadiene having a cis-1,4 content of about 40% to about 100%, a Mooney viscosity of at least about 35, a molecular weight of at least about 150,000, and a polydispersity of less than about 4. Examples of desirable polybutadiene rubbers include Buna® CB22 and CB23 from Bayer, Ubepol® 360L and 150L from Ube Industries, and Cariflex® BCP820 and BCP824 from Shell Chemical. Blends of two or more such polybutadienes are desirable for the solid cores. In one embodiment, a cobalt or nickel catalyzed polybutadiene having a Mooney viscosity of from about 50 to about 150 is mixed with a neodymium catalyzed polybutadiene having a Mooney viscosity of from about 30 to about 100. The weight ratio between the two polybutadienes may range between about 5:95 and 95:5. The polybutadiene can also be mixed with other elastomers known in the art, such as natural rubber, polyisoprene rubber and/or styrene-butadiene rubber, in order to modify the properties of the core.

Suitable cross-linking agents for the polybutadiene-based solid cores include metal salts of unsaturated fatty acid having 3 to 8 carbon atoms, such as monoacrylate, diacrylate, monomethacrylate, and dimethacrylate. The metal can be magnesium, calcium, zinc, aluminum, sodium, lithium or nickel. Preferred cross-linking agents include zinc diacrylate, zinc dimethacrylate, and blends thereof. Zinc diacrylate is preferred because it provides golf balls with a high initial velocity, but the present invention is not limited thereto. The cross-linking agent is present in an amount of preferably at least about 15 parts per 100 parts by weight of the base polymer ("phr"), more preferably between about 15 phr and about 40 phr. In the manufacturing process, it is beneficial to pre-blend some cross-linking agent(s) with the base rubber in a master batch prior to the addition of other components.

The free radical initiator is used to promote the cross-link reaction between the base rubber and the cross-linking agent. Suitable free radical initiators include thermal initiators such as peroxide initiators, and photoinitiators reactive to energy sources such as UV irradiation, visible light irradiation, infrared irradiation, microwave irradiation, electron beam irradiation, x-ray irradiation, and γ-ray irradiation. Peroxide initiators are well known in the art, and can be any known peroxides or blends thereof that decompose when heated during the cure cycle. Suitable peroxide initiators include organic peroxide compounds, such as dicumyl peroxide, di-t-butyl peroxide, 1,1-di(t-butylperoxy)-3,3,5-trimethylcyclohexane, α,α-bis(t-butylperoxy)-diisopropylbenzene, t-butyl perbenzoate, 2,5-dimethyl-2,5-di(t-butylperoxy)-hexane, and the like or blends thereof. Commercially available examples include, but are not limited to, Varox® 231XL and DCP-R from AtoFina, Perkadox® BC and 14 from Akzo Nobel, and Elastochem® DCP-70 from Rhein Chemie. In their pure forms, the initiators are present in an amount of at least about 0.25 pph of the base polymer, preferably between about 0.5 pph and about 2.5 pph. It is understood to one skilled in the art to adjust the amount of the initiators according to their activity and concentration to affect the curing of the golf ball core.

In polybutadiene-based solid cores of the present invention, it is preferred to blend in a plasticizer, particularly a halogenated thiophenol compound such as a halogenated thiophenol or a metal salt thereof, to further enhance the softness and resiliency of the core. The halogenated thiophenol, preferably pentachlorothiophenol ("PCTP") or ZnPCTP, function in part as a cis-to-trans catalyst that convert some cis-1,4 bonds in the polybutadiene into trans-1,4 bonds. The utilization of halogenated thiophenol compounds like PCTP and ZnPCTP in golf balls to produce soft and fast cores is disclosed in co-pending U.S. patent application Ser. No. 09/951,963, which is incorporated by reference herein in its entirety. PCTP is available under the tradename of Struktol® from Struktol Company of America, and ZnPCTP is available from eChinaChem. The halogenated thiophenol compounds are present in an amount of at least about 0.1 pph of the base rubber, preferably about 0.1 pph to about 2 pph; alternatively the amount of halogenated thiophenol compound used is at least about 2 pph, preferably about 2.3 pph to about 5 pph.

The solid core may also include fillers to adjust hardness, strength, modulus, weight, density and/or specific gravity of the core. Suitable fillers include metal or alloy powders, metal oxides and salts, ceramics, particulate, carbonaceous materials, polymeric materials, glass microspheres, and the like or blends thereof. These fillers may be hollow, solid, filled, unfilled, surface treated, or non-surface treated. Specific fillers for the core include tungsten powder, tungsten carbide, zinc oxide, tin oxide, tungsten oxide, barium sulfate, zinc sulfate, barium carbonate, calcium carbonate, zinc carbonate, an array of silica and clay, regrind (recycled core material typically ground to about 30 mesh particle), and high-Mooney-viscosity rubber regrind. Certain fillers such as zinc oxide may also participate as a co-agent in the cross-link reaction of other core components.

Other optional additives for the golf ball core are well known in the art, and may be blended into the core in amounts sufficient to achieve their specific purposes and desired effects. Such additives include antioxidants to prevent the breakdown of the base polymer, accelerators to speed up the polymerization reaction, processing aids or oils to affect rheological and mixing properties, activators such as zinc stearate, foaming agents, cis-to-trans catalysts, adhesives, coupling agents, lubricants, stable free radicals, radical scavengers, scorch retarders, and blends thereof.

Single-piece cores of the present invention preferably have a diameter of less than about 1.64 inches, a specific gravity of less than about 1.4 g/cm$^3$, a compression of less than about 100, a deflection at 100 kg of greater than about 1.5 mm, a COR of at least about 0.78, and a decreasing hardness gradient from periphery to center. More preferably, the peripheral hardness of the core is greater than its central hardness by at least about 5 Shore C. Two-piece (dual) cores or multi-piece cores have different compositions and properties for the center and at least one outer core layer. The center has a ZDA level between about 15 phr and about 40 phr, incorporates at least a regrind or a filler, and optionally blends in a plasticizer like ZnPCTP. The center preferably has a diameter of about 0.5 inches to about 1.6 inches, a compression between about 10 to about 100, and a deflection at 100 kg of greater than about 1.5 mm. The outer core layer has a ZDA content between about 25 phr and about 55 phr, incorporates at least one of regrind, balata, or filler, and optionally blends in a plasticizer. The outer core layer has a material hardness of at least about 60 Shore C. The core comprising the center and the outer core layer has a diameter of less than about 1.64 inches, a compression of less than about 100, a deflection at 100 kg of greater than about 1.5 mm, and a COR of at least about 0.78. In one embodiment, the core has a diameter of greater than about 1.62 inches. Conventional methods and techniques such as compression molding are used to form the solid cores from the base compositions disclosed herein.

To prevent or minimize the penetration of moisture, typically water vapor, into the core, a barrier layer is disposed between the core and the cover, preferably immediately around the core. The barrier layer has a MVTR less than that of the cover, preferably less than about 0.95 grams·mm/(m$^2$·day). The barrier layer of the present invention preferably comprises a thin and soft rubber layer, optionally having microparticles dispersed within a rubber material. These particles are preferably hydrophobic and create a tortuous (random and non-linear) path across the barrier layer to reduce its MVTR. The microparticles for the present invention refers to particulates that are sized on the order of several hundred microns or less, and include nanoparticles that are sized from a few nanometers to less than about 1 micron. Suitable microparticles can be pigmented or non-pigmented, and include fibers, whiskers, and flaked metals (either leafing or non-leafing), such as aluminum flakes, iron oxide flakes, copper flakes, bronze flakes, and the like or combinations of two or more thereof. Leafing metal flakes are particularly suited for use in the present invention. Preferred metal flakes include aluminum flakes and, more specifically, aluminum oxide flakes. Microparticles sized preferably about 4 microns to about 335 microns, more preferably about 5 microns to about 50 microns, and most preferably about 8 microns to about 32 microns are used. The aspect ratio of the flakes is at least about 25, and up to about 30,000, preferably about 100 to about 50 to about 20,000, more preferably about 100 to about 10,000. The amount of the microparticles present in the barrier layer is at least about 10 parts by weight per 100 parts by weight of the rubber material ("phr"), preferably between about 50 phr and about 250 phr, more preferably between about 70 phr and about 125 phr. The barrier layer may have a single layer or a plurality of sub-layers.

The rubber material suitable for the barrier layer include, but are not limited to, synthetic or natural rubbers, such as polyolefins, styrenic polymers, single-site catalyzed polymers, acrylics, etc. Polyolefins and copolymers or blends thereof include balata, polyethylene, chlorinated polyethylene, polypropylene, polybutylene, butyl-based rubbers, isoprene rubber, trans polyisoprene, neoprene, ethylene-propylene rubber, ethylene-butylene rubber, and ethylene-propylene-(non-conjugated diene) terpolymers. Styrenic polymers include polystyrenes and copolymers thereof, such as styrene-butadiene copolymers, poly(styrene-co-maleic anhydride), acrylonitrile-butylene-styrene copolymers, styrene-olefin block copolymers (e.g. Kraton® rubbers from Shell Chemical), and poly(styrene sulfonate). Examples of styrene-olefin block copolymers are described in U.S. Pat. Nos. 4,501,842, 5,118,748, and 6,190,816. The disclosures of these patents are incorporated herein by reference in their entirety. Single-site catalyzed polymers include homopolymers and copolymers, such as grafted or non-grafted metallocene-catalyzed polyolefins. Compatibilizers may be added into the blends. The compatibilizer material is often a block copolymer where each block has an affinity for only one of the blend components to be compatibilized. The compatibilizer is thought to associate across the boundaries between phase-separated regions in the polymer blend. It is used to bind the regions together and to enhance the structural integrity and mechanical properties of the resulting compatibilized material. Optionally, these thermoplastic rubbers or blend thereof are mixed with a cross-linking agent to form a thermoset rubber material. Suitable cross-linking agents include the polymeric polyahls disclosed herein, particularly polyolefin polyols such as hydrogenated polybutadiene polyols (e.g. Polytail® H and Polytail® HA available from Mitsubishi Kasei Corp. of Tokyo, Japan, and Kraton® L-2203 available from Kraton Polymers of Houston, Tex.). The amount of the cross-linking agent is at least about 10 parts per 100 parts by weight of the rubber material, more preferably at least about 20 phr. Other additives suitable for the barrier layer include, but are not limited to, catalysts such as tertiary amines, and coupling agents such as silanes to bond the fillers to the polymer matrix. The coupling agent further enhances adhesion of the barrier layer to substrates such as a golf ball core or outer core layer, and to the layer such as a cover layer or an intermediate layer formed immediately over the barrier layer.

With the presence of the microparticles such as aluminum flakes, the barrier layer can acquire a specific gravity that is higher than that of the core, resulting in a golf ball of high moment of inertia. The barrier layer has a particle-to-binder weight ratio ("P/B") of about 0.5 to about 2.5, preferably about 1 to about 2. The barrier layer has a specific gravity of preferably about 1 $g/cm^3$ to about 1.5 $g/cm^3$, more preferably about 1.2 $g/cm^3$ to about 1.35 $g/cm^3$. The difference in specific gravity between the barrier layer and the core can be greater than about 0.1 $g/cm^3$. The core diameter can be 1.5 inches or greater, preferably greater than about 1.55 inches, and more preferably about 1.62 inches to about 1.65 inches. Thickness of the barrier layer can be less than about 0.2 inches, but is preferably less than about 0.02 inches, more preferably about 0.001 inches to about 0.01 inches, and most preferably about 0.002 inches to about 0.007 inches. Sward hardness of the barrier layer is preferably between about 5 and about 20. Pencil hardness of the barrier layer is preferably between about 5B and about F.

The barrier layer of the present invention is preferably disposed about or embedded in any portions of a golf ball where a reduction in MVTR is desirable. Such portions include, without limitation, the core, a center within the core, an outer core layer of the core, a wound layer, an intermediate layer between the core and the cover, and an inner cover layer of the cover. Two or more barrier layers of the same or different compositions may be used in a golf ball where two or more portions have moisture absorption problems. Advantageously, each barrier layer protects a preselected portion of the golf ball, such that if moisture vapor penetrates an outer barrier layer, the interior layers remain protected by the inner barrier layer(s). The barrier layer is placed adjacent to the golf ball portion, covering its entire outer surface or substantially encapsulating the portion. Optionally, an adhesive or a coupling agent is used to bond the barrier layer to the portion. Alternatively, an in situ reaction takes place to form direct chemical linkages between the barrier layer and the portion. The barrier layer is preferably adjoining, more preferably contiguous, to the underlying golf ball portion. Where a liquid core is used, the moisture vapor barrier layer may serve the added function of preventing moisture vapor from exiting the liquid core to the atmosphere.

The barrier layer may be made by a number of methods. For example, the barrier layer composition may be preformed into semi-cured shells. Specifically, a quantity of the barrier material is placed into a compression mold and molded under sufficient pressure, temperature and time to produce semi-cured, semi-rigid half-shells. The half-shells are then place around a core or a sub-assembly and cured in a second compression mold to reach the desirable size. In a shrink-wrap method, thin sheet stock of the barrier material is placed tightly against the mold cavity wall of the upper and lower platens of a compression mold press through vacuum suction. The core or sub-assembly is inserted into the mold cavity between the sheet stock. The press is closed to compression mold and cure the barrier layer. In an injection molding method, a mixed stock of the barrier material is fed into an injection molding barrel and screw, then injected through a nozzle into a mold cavity to surround the core or sub-assembly. Heat and pressure is applied to the mold to cure the barrier layer.

A more preferred method to form the barrier layer of the present invention is spraying, in which the solid composition of the barrier layer is dispersed in a non-aqueous solvent system, and the dispersion is sprayed on golf ball precursors such as cores and then dried. Suitable solvents to disperse the binder rubber and the particles include, but are not limited to, aromatic hydrocarbons such as xylene (CAS# 1330-20-7) and toluene (CAS# 108-88-3); ketones such as methyl ethyl ketone (MEK, CAS# 78-93-3), methyl isobutyl (MIBK, CAS# 108-10-1), methyl n-amyl ketone (MAK, CAS# 110-43-0), and diisobutyl ketone (DIBK, CAS# 108-83-8); acetates such as n-butyl acetate (CAS# 123-86-4) and ethyl acetate (CAS# 141-78-6); alcohols such as n-amyl alcohol (CAS# 71-41-0); esters; or mixtures thereof. For ease of processing, the rubber materials are first dispersed in the solvents to form an intermediate with a relatively high viscosity (about 20,000 cps to about 50,000 cps) and a relatively high solid content (at least about 30%). The rubber intermediate is then co-dispersed with the particles in more solvents to form the sprayable dispersion having a viscosity of preferably about 300 cps to about 1,500 cps, more preferably about 500 cps to about 1,000 cps, and most preferably about 700 cps to about 900 cps. The solvent-borne sprayable dispersion has a solid content of at least about 10%, more preferably at least about 15%, and most preferably about 15% to about 40%.

Machinery setup to form the barrier layer via spraying typically uses a golf ball coater system well known to one of ordinary skill in the art. A coater line serves to spin the cores and pass them through a coating station. Within the coating station, a top spray gun and a bottom spray gun are set up to spray the top and bottom hemispheres of the cores, respectively. Both spray guns are stationary and positioned to aim at about 45 degrees from the core equator. The sprayable dispersion is placed in a pressurized pressure pot that supplies the spray guns. Sequentially, the coater line is started to move and spin the cores, and the spray guns are turned on to spray the dispersion onto the cores. Parameter ranges for each component of the coater system are detailed in the examples below.

The skilled artisans would understand to adjust various components of the coater system and their parameters for desirable results. They are also aware of other suitable manufacturing techniques for applying the dispersion of the present invention, including dipping, vacuum deposition, reaction injection molding, among others. After the application of the dispersion, the barrier layer formed therefrom becomes tack free at ambient temperature in about 5 to about 10 minutes. Preferably, the cores with the barrier layer thereon are dried, such as in a convention oven, at a temperature of about 180° F. to about 250° F. for a time period of about 10 minutes to about 60 minutes. The dry weight of the barrier layer is dependent on the solid composition of the dispersion and the size of the underlying core. Preferably, the dry weight of the barrier layer is at least about 0.3 grams per golf ball. After drying, the barrier layer may optionally undergo further surface treatment prior to the application of the cover, such as plasma, corona, silane dip, or combinations thereof.

Golf ball cover of the present invention is preferably tough, cut-resistant, and selected from conventional materials used as golf ball covers based on the desired performance characteristics. The cover may comprise one or more layers, such as an outer cover layer and one or more inner cover layer(s). Inner cover layer(s) may be wound layer(s) or hoop stress layer(s). Suitable cover materials include non-ionomeric acid copolymers, such as ethylene (meth) acrylic acid copolymers and terpolymers having an acid content of about 2% to about 50%, under the trade names of Nucrel® from E. I. DuPont de Nemours & Company and Escor® from ExxonMobil; anionic and cationic ionomers, such as the acid copolymers partially or fully neutralized with organic or inorganic cations by about 1% to about 100% or more, under the trade names of Surlyn® from E. I. DuPont de Nemours & Company and Iotek® from ExxonMobil; thermoplastic or thermoset (vulcanized) synthetic or natural rubbers, such as polyolefins and copolymers or blends thereof, polystyrenes and copolymers thereof, and polymers produced with single-site catalysts such as metallocene; thermoplastic or thermoset polyurethanes; thermoplastic or thermoset polyureas; aliphatic or aromatic thermoplastics, such as polyesters (Hytrel® from E. I. DuPont de Nemours & Company and Lomod® from General Electric Company), polycarbonates, polyacetals; polyimides, polyetherketones, polyamideimides, block copolymers (Kraton® rubbers from Shell Chemical), and co-polyetheramides (Pebax® from AtoFina); vinyl resins such as polyvinyl alcohol copolymers and PVDC; polyamides such as poly(hexamethylene adipamide) and others prepared from diamines, fatty acids, dibasic acids, and amino acids; acrylic resins; synthetic or natural vulcanized rubber such as balata; and blends and alloys, such as blends of polycarbonate and acrylonitrile-butylene-styrene, blends of polycarbonate and polyurethane, and blends of polyvinyl chloride with acrylonitrile-butadiene-styrene or ethylene vinyl acetate.

Preferably, the golf ball cover comprises a polyurethane or polyurea composition having a reaction product formed from a polyahl, an isocyanate, and an optional curing agent. The polyahls are preferably incorporated into one or more soft segments of the reaction product, and are substantially absent in any hard segments. Suitable polyahls such as polyols and polyamines are organic, modified organic, saturated, aliphatic, alicyclic, unsaturated, araliphatic, aromatic, substituted, unsubstituted, or ionomeric, having two or more reactive hydrogen groups per molecule, such as primary or secondary hydroxy groups or amine groups. The isocyanate-reactive hydroxy and/or amine groups may be terminal or pendant groups on the oligomeric or polymeric backbone, and in the case of secondary amine groups, may even be embedded within the backbone.

Any isocyanate available to one of ordinary skill in the art is suitable for use according to the invention. The isocyanate may be organic, modified organic, saturated, aliphatic, alicyclic, unsaturated, araliphatic, aromatic, substituted, or unsubstituted diisocyanate or polyisocyanate monomers having two or more free reactive isocyanate ("NCO") groups; isomers thereof; modified derivatives thereof; dimers thereof; trimers thereof; or isocyanurates thereof. The isocyanate may also include any isocyanate-terminated multimeric adducts, oligomers, polymers, prepolymers, low-free-monomer prepolymers, quasi-prepolymers, and modified polyisocyanates derived from the isocyanates and polyisocyanates above. Low-free-monomer prepolymers refer to prepolymers having free isocyanate monomer levels less than about 0.5 weight percent. Curing agents are monomeric, oligomeric, or polymeric compounds used in cover compositions for chain-extension and/or crosslink. Suitable curing agents for the invention include polyahls and epoxies, preferably hydroxy curatives, amine curatives, and amino alcohol curatives having a molecular weight of about 50 to about 5,000.

For best light stability, all reactants in the polyurethane or polyurea compositions, including the polyahl(s), the isocyanate(s), and the curing agent(s) are substantially saturated. A hindered secondary diamine having a high level of stearic hindrance, such as Clearlink® 1000 (4,4'-bis(sec-butylamino)-dicyclohexylmethane) from Dorf Ketal Chemicals LLC, may be used to beneficially slow down the curing process.

A variety of additives can optionally be incorporated into the cover layer compositions of the present invention in amounts sufficient to achieve their specific purposes and desired effects. For example, a catalyst such as dibutyltin dilaurate (Dabco® T-12), in an amount of about 0.001 weight percent to about 5 weight percent of the total formulation, may be employed to promote the reaction between the curing agent and the prepolymer. UV absorbers, light stabilizers (preferably hindered amine light stabilizers), and antioxidants are used to prevent cover yellowing and surface fractures due to photo-degradation. Other additive include, but are not limited to, accelerators, fillers, viscosity modifiers, release agents, plasticizers, compatibilizing agents, coupling agents, dispersing agents, colorants including pigments and dyes, optical brighteners, surfactants, lubricants, stabilizers, metals, processing aids or oils, blowing agents, freezing point depressants, and any other modifying agents known to one of ordinary skill in the art. Dispersing agents can be anionic, cationic, and nonionic, including materials otherwise known as leveling agents, emulsifiers, anti-foaming agents, wetting agents, surfactant, etc. Pigments may be fluorescent, autofluorescent, luminescent, or chemoluminescent, and include white pigments such as titanium oxide and zinc oxide. Fillers are used to adjust properties such as density or specific gravity, flexural modulus, tensile modulus, strength, moment of inertia, hardness, abrasion resistance, weatherability, volume, weight, etc. The fillers are preferably in the forms of nano-scale or micro-scale powders, fibers, filaments, flakes, whiskers, wires, tubes, or particulates for homogenous dispersion.

The cover layer preferably has a flexural modulus of at least about 2,000 psi, a material hardness between about 25 Shore D and about 65 Shore D, and a hardness as measured on the ball of less than about 80 Shore D. In one embodiment, the cover layer has a Shore D hardness of about 30 to about 60 and a flexural modulus of about 10,000 psi to about 80,000 psi. A thin cover layer with a thickness of about 0.01 inches to about 0.04 inches is preferred for players with high swing speeds, while a relatively thick cover layer of greater than 0.04 inches to about 0.08 inches, more preferably about 0.05 inches to about 0.07 inches, is preferred for players with moderate swing speeds. The later benefits from a golf ball of the present invention, having a high energy, large PBD core for distance off the tee and more spin, feel, and playability for greenside play from a relatively thick thermoset polyurethane or polyurea cover, without the moisture absorption problem normally associated with conventional urethane covered, PBD core golf balls. In a preferred embodiment, the cover thickness is less than 0.03 inches.

Any method known to one of ordinary skill in the art may be used to produce the cover layer of the present invention.

One-shot method involving concurrent mixing of the isocyanate, the polyether polyahl, and the curing agent is feasible, but the resulting mixture is non-homogenous and difficult to control. The prepolymer method described above is most preferred, because it affords a more homogeneous mixture resulting in a more consistent polymer composition. The prepolymer may be reacted with a diol or a secondary diamine to form a thermoplastic material, or reacted with a triol, tetraol, primary diamine, triamine, or tetramine to form a thermoset material. Other methods suitable for forming the layers include casting, compression molding, reaction injection molding ("RIM"), liquid injection molding ("LIM"), injection-compression molding, pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials such as polyurea, polyurethane, and polyurethane/polyurea hybrid can provide very thin layers such as outer cover layers that are desirable on golf balls. Other techniques include spraying, dipping, spin coating, or flow coating methods.

An optional intermediate layer may be disposed between the core and the cover, preferably between the cover and the barrier layer. The intermediate layer may be part of the core as an outer core layer, or part of the cover as an inner cover layer. The intermediate layer of the golf ball may be formed from non-ionomeric acid polymers or ionomeric derivatives thereof, polyamides, polyolefins, polyurethanes, polyureas, epoxies, polyethers, polyesters, polyetheresters such as Hytrel® from DuPont, polyetheramides such as Pebax® from AtoFina, nylons, metallocene-catalyzed polymers, styrenic block copolymers such as Kraton® from Shell Chemicals, acrylonitrile-butadiene-styrene copolymers ("ABS"), polyvinyl chlorides, polyvinyl alcohol copolymers, polycarbonates, polyesteramides, polyamides, polyimides, polyetherketones, polyamideimides, silicones, metal salts of fatty acids, and combinations thereof, such as blends of polycarbonate and acrylonitrile-butadiene-styrene, blends of polycarbonate and polyurethane. Two or more of these materials may be blended together to form the intermediate layer.

The intermediate layer may incorporate a modulus-enhancing filler or a density-modifying filler to attain preferred physical and mechanical properties. The composition of the intermediate layer may have a modulus of about 1,000 psi to about 150,000 psi, a material hardness of about 20 Shore C to about 80 Shore D, and a thickness of about 0.005 inches to about 0.6 inches. The composition of the intermediate layer may be applied as a liquid, powder, dispersion, lacquer, paste, gel, melt, or solid half shells. The intermediate layer may be formed around the core or onto the inside of the cover by sheet stock or vacuum shrink-wrapping, compression molding, injection molding, vacuum deposition, RIM, lamination, casting, spraying, dipping, powder coating, or any other deposition means. Preferably, a combination of these methods is used, such as injection/compression molding, RIM/compression molding, pre-form/compression molding, injection molding/grinding, injection/progressive compression molding, co-injection molding, or simplified casting of a single block material.

The resulting golf ball, including the core, the barrier layer, the optional intermediate layer, and the cover as described above, preferably has a COR of greater than about 0.79, a compression of less than about 110, a moment of inertia of less than about 84 g·cm$^2$, and a deflection at 100 kg of greater than about 1.5 mm. The golf ball preferably has an overall diameter of at least about 1.68 inches, more preferably from about 1.68 inches to about 1.76 inches. In a preferred embodiment, a polyurethane or polyurea cover is disposed immediately about the barrier layer so that the two are contiguous with each other. The coupling agent used in the barrier layer with its functionality forms direct linkage with components of the cover, thereby substantially enhances the adhesion between the two layers. At least 60% of the outermost surface of the golf ball is covered by about 250 to about 450 dimples of equal or different shape and size. Preferred dimple patterns involving catenary curves, and preferred lift and drag characteristics of the golf ball of the present invention are disclosed in co-pending U.S. application Ser. Nos. 09/989,191 and 10/096,852, respectively, both incorporated herein by reference in their entirety.

The barrier layers of the present invention and their application in golf balls are further illustrated in the following non-limiting examples. Exemplary barrier layer compositions, available from PPG industries, Inc. of Pittsburgh, Pa., are listed below in Table I.

TABLE I

| Formula | Composition | | P/B | Sward Hardness | Pencil Hardness |
| --- | --- | --- | --- | --- | --- |
| | Particle | Binder | | | |
| 02-005-94D | 50 parts E30B[1] | 100 parts FG1901X[2] | 0.5 | 14 | HB |
| 02-005-94C | 75 parts E30B | 100 parts FG1901X | 0.75 | 10 | B |
| 02-005-94A | 100 parts E30B | 100 parts FG1901X | 1.0 | 12 | 2B |
| 02-005-93A | 80 parts E30B | 80 parts FG1901X; 20 parts Polytail H[3] | 0.8 | 8 | 4B |
| 02-005-81A[4] | 200 parts E30B | 80 parts FG1901X; 20 parts Polytail H | 2.0 | 6 | 5B |
| 02-005-108A | 100 parts E30B | 100 parts FG1901X | 1.0 | 12 | 2B |

[1]E30B is a specie of aluminum-based leafing flakes, with an averaged particle size of about 13 microns, available from ECKART America of Painesville, OH.
[2]FB1901X is a Kraton ® rubber from Shell Chemical of Houston, TX.
[3]Polytail ™ H is a cross-linking agent from Mitsubishi Kasei Corporation of Tokyo, Japan.
[4]This composition further includes 2.5 parts of a tertiary amine catalyst (Armeen ® DM12D from Albemarle Corporation of Baton Rouge, LA) and 0.7 parts of a coupling agent (Silquest ® A-1100 from Crompton Corporation - OSi Specialties of South Charleston, WV)

To form Formula 02-005-108A, a 1-gallon intermediate of Kraton® FG1901X in a solvent blend of 75% toluene and 25% MIBK with a solid content of about 33% was first formed to ease the processing. With Cowles agitation, 900 grams of Kraton® FG1901X resin (in bead form) was slowly mixed into a solvent blend of 1,350 grams of toluene and 450 grams of MIBK in a 1-gallon container, and then dissolved using high speed agitation. Since the shearing action of the Cowles blade could heat up the flammable solvent blend, as a precaution, the solvent temperature was controlled to below about 140° F. using, for example, a water jacket or air cooling. The Kraton® intermediate had a viscosity of about 28,000 cps to about 35,000 cps at about 24° C. Also with Cowles agitation, 615.2 grams of Eckart® E30B leafing aluminum pigment with a solid content of about 65%, which comprised 400 grams of leafing flakes, was slowly and thoroughly mixed into a solvent blend of 640 grams of Aromatic 100 (CAS# 64742-95-6) and 160 grams of MIBK in another 1-gallon container. The mixing typically took about 15 minutes at medium agitation, until no agglomerates or flocculated flakes was visible along the side wall of the container. Then, 1,200 grams of the Kraton® intermediate was slowly mixed in for another 15 minutes at medium agitation speed. As a result, the formula 02-005-108A had a P/B of 1.0.

To form the barrier layer over the core, the gallon-sized container with the Formula 02-005-108A therein was first placed on a paint shaker for about 7 minutes to ensure homogeneity of the sprayable dispersion, and then placed in a sealed pressure pot. Preferably the pressure pot had stirring capability to keep the dispersion homogenous. Viscosity of the 02-005-81A composition was measured to be in the range of about 600 cps to about 850 cps. This dispersion did not require further dilution prior to application, and was used at ambient temperature. The particular spray guns used were Binks® Model 95AR pneumatically activated spray guns available from ITW Industrial Finishing of Glendale Heights, Ill., in combination with spray nozzles 68PB, fluid nozzles 68SS (2.8 mm orifice diameter), and needle stems 768. Alternatively, the same spray gun can be used in combination with spray nozzles 67PB, fluid nozzles 67SS (2.2 mm orifice diameter), and needle stems 767. Various parameters of the pressure pot, the coater line, the top spray gun, and the bottom spray gun used in preparing golf ball precursors of Groups 1–3 are listed in Table II below.

TABLE II

| Component | Parameter | Value |
|---|---|---|
| Coater Line | Line speed | ~60 balls per minute |
| | Spin rate | ~300 rpm |
| Pressure Pot | Pressure | 40 psi |
| Top Spray Gun | Open clicks | 25 clicks from open position |
| | Fan Pattern | Half open |
| | Atomization air pressure | 50 psi (45 psi triggered) |
| | Fluid flow rate | 375 cm$^3$/min |
| Bottom Spray Gun | Open clicks | 60 clicks from open position |
| | Fan Pattern | Full open |
| | Atomization air pressure | 50 psi (45 psi triggered) |
| | Fluid flow rate | 300 cm$^3$/min |

To form the formula 02-005-81A, a Kraton® FG1901X intermediate with a solid content of about 16.7% was first made by mixing and dissolving 400 grams of Kraton® FG1901X resin in bead form into 2,000 grams of toluene under high speed Cowles agitation in a 1-gallon container. A Polytail™ H intermediate with a solid content of 10.8% was also made by dissolving 300 grams of Polytail™ H with stirring into 2,476.5 grams of toluene in a 5-liter flask. The flask was heated to 95° F., and then to 130° F. over 3 hours. The Polytail™ intermediate was stirred for another 2 hours at 130° F. before cooling down to room temperature, after which it was filtered through a 5-micron bag into a 1-gallon container. Then, 461.4 grams of the Eckart® E30B leafing aluminum pigment was mixed with 663 grams of the Kraton® intermediate and 277.7 grams of the Polytail™ intermediate in a separate 1-gallon container. About 30 minutes of medium Cowles agitation was sufficient to disperse the leafing aluminum agglomerates into the solvent-resin blend. This was followed by slow addition of 3.75 grams of Armeen® DM12D and 1.05 grams of Silquest® A-1100. A significant increase in viscosity ensued in less than about 30 seconds. Finally, 1,350 grams of toluene was added to result in Formula 02-005-81A having a P/B of about 2 and a solid content of about 16%.

To demonstrate application of the barrier layer, five groups of golf ball precursors were constructed. Core group included twelve polybutadiene-based cores of about 1.55 inches in diameter. Groups 1, 2, and 3 each included twelve precursors having a core as the core group encapsulated in a barrier layer formed of Formula 02-005-81A with a thickness of about 0.0035 inches, about 0.0045 inches, and about 0.0069 inches, respectively. Control group included twelve precursors having a core as the core group encapsulated in a Surlyn® ionomer mantle layer of about 0.035 inches thick. Formula 02-005-81A provided a MVTR of less than about 0.65 grams·mm/(m$^2$·day).

To demonstrate weight changes and concomitant compression changes due to moisture uptake, all five groups were subjected to three consecutive cycles of exposure in a humidity box at about 100% humidity and about 100° F. The results following each cycle are reported in Table III below, which show that the barrier layer of various thicknesses is effective in reducing weight gain and compression increase due to water vapor absorption in PBD-based golf ball cores. The barrier layer provides a reduction in core moisture uptake of at least about 30%, preferably at least about 50%, and more preferably greater than about 60%, in comparison with bare cores. The thin barrier layer more impervious to water vapor than the relatively thick ionomer layer, with a reduction in moisture uptake of at least about 20%, preferably at least about 40%. The concomitant reduction in compression increase, as provided by the barrier layer of the invention, ranges from about 20% to about 60% with respect to bare cores.

TABLE III

| | Post-Cycle ΔCompression | Cumulative ΔCompression | Post-Cycle ΔWeight (g) | Cumulative ΔWeight (g) |
|---|---|---|---|---|
| Cycle I - 17 days | | | | |
| Core | 10 | 10 | 0.26 | 0.26 |
| Group 1 | 4 | 4 | 0 | 0 |
| Group 2 | 5 | 5 | −0.03 | −0.03 |
| Group 3 | 8 | 8 | −0.12 | −0.12 |
| Control | 0 | 0 | 0.08 | 0.08 |
| Cycle II - 20 days (cumulative 37 days) | | | | |
| Core | 6 | 16 | 0.15 | 0.40 |
| Group 1 | 5 | 9 | 0.06 | 0.06 |
| Group 2 | 5 | 10 | 0.04 | 0.01 |
| Group 3 | 4 | 11 | 0.01 | −0.11 |
| Control | 4 | 4 | 0.06 | 0.13 |

TABLE III-continued

| | Post-Cycle ΔCompression | Cumulative ΔCompression | Post-Cycle ΔWeight (g) | Cumulative ΔWeight (g) |
|---|---|---|---|---|
| Cycle III - 34 days (cumulative 71 days) | | | | |
| Core | 4 | 20 | 0.17 | 0.56 |
| Group 1 | 1 | 11 | 0.09 | 0.16 |
| Group 2 | 1 | 12 | 0.08 | 0.12 |
| Group 3 | 1 | 13 | 0.05 | 0.05 |
| Control | 1 | 4 | 0.09 | 0.20 |

In one particular example, a two-piece golf ball includes a core, a cover, and a barrier layer of the present invention between the core and the cover. The core is formed of a polybutadiene having a Mooney viscosity of greater than about 35, an initiator, and a ZDA level of about 15 phr or greater. Optionally, the core incorporates ZnPCTP. The core has a diameter of less than about 1.64 inches, a specific gravity of less than about 1.4 g/cm$^3$, a compression of less than about 100, a deflection at 100 kg of greater than about 1.5 mm, and a COR of greater than about 0.78. The core is harder on the outside than on the inside, with a peripheral hardness greater than a central hardness by at least about 5 Shore C. The barrier layer is formed of a particle dispersed in a binder, with a P/B of about 1 to about 2. Preferably, the particle is leafing flakes of aluminum, more preferably aluminum oxide, and the binder includes a styrenic rubber such as Kraton® by Shell Chemicals. The barrier layer has a thickness of less than about 0.02 inches, and a MVTR less than that of a Surlyn® by DuPont. The cover is formed of a thermoplastic or thermoset polyurethane or polyurea, having a material hardness of about 25 Shore D to about 65 Shore D, and a flexural modulus of greater than about 2,000 psi. Preferably, the cover is directly adhered to the barrier layer through a coupling agent incorporated in the barrier layer. The resulting golf ball is covered with about 250 to about 450 dimples, and has a compression less than about 110, a deflection at 100 kg greater than about 1.5 mm, a moment of inertia less than about 84 g·cm$^2$, and a coefficient of restitution greater than about 0.79.

In another example, a three-piece golf ball includes a dual core, a cover, and a barrier layer between the dual core and the cover. The dual core is formed of a center and an outer core layer disposed about the center. The center includes a polybutadiene with a Mooney viscosity of greater than about 35, an initiator, and a ZDA level of about 15 phr to about 40 phr. The center further incorporates a regrind or filler such as tungsten metal powder. The center has a diameter of about 0.5 inches to about 1.6 inches, a compression of about 10 to about 100, and a deflection at 100 kg of greater than about 1.5 mm. The outer core layer includes a polybutadiene with a Mooney viscosity of greater than about 35, an initiator, and a ZDA level of about 25 phr to about 55 phr. The outer core layer further incorporates a regrind, a polyisoprene such as balata, or a filler such as tungsten metal powder. Optionally, the center, the outer core layer, or both can incorporate ZnPCTP. The resulting dual core has a diameter of less than about 1.64 inches, a compression of less than about 100, a deflection at 100 kg of greater than about 1.5 mm, a peripheral hardness of greater than about 60 Shore C, and a COR of greater than about 0.78. The barrier layer is formed of a particle dispersed in a binder, with a P/B ratio of about 1 to about 2. Preferably, the particle is leafing flakes of aluminum, more preferably aluminum oxide, and the binder includes a styrenic rubber such as Kraton® by Shell Chemicals. The barrier layer has a thickness of less than about 0.02 inches, and a MVTR less than that of a Surlyn® by DuPont. The cover is formed of a thermoplastic or thermoset polyurethane or polyurea, having a material hardness of about 25 Shore D to about 65 Shore D, and a flexural modulus of greater than about 2,000 psi. Preferably, the cover is directly adhered to the barrier layer through a coupling agent incorporated in the barrier layer. The 3-piece golf ball is covered with about 250 to about 450 dimples, and has a compression less than about 110, a deflection at 100 kg greater than about 1.5 mm, a moment of inertia less than about 84 g·cm$^2$, and a coefficient of restitution greater than about 0.79.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising a core, a barrier layer enveloping the core, and a cover enveloping the barrier layer, wherein the barrier layer has a moisture vapor transmission rate less than that of the cover, and the barrier layer comprises a thermoplastic or thermoset composition of microparticles dispersed in a binder comprising synthetic rubbers, natural rubbers, polyolefins, styrenic polymers, or single-site catalyzed polymers, and the microparticles comprise fibers; whiskers; metal flakes; micaceous particles; or nanoparticles.

2. The golf ball of claim 1, wherein the microparticles are present in an amount of about 50 parts to about 250 parts per 100 parts by weight of the binder.

3. The golf ball of claim 1, wherein the composition has a particle-to-binder weight ratio of about 1 to about 2.

4. The golf ball of claim 1, wherein the barrier layer has a thickness of about 0.001 inches to about 0.01 inches.

5. The golf ball of claim 1, wherein the barrier layer has a thickness of about 0.002 inches to about 0.007 inches.

6. The golf ball of claim 1, wherein the barrier layer has a Sward hardness of about 5 to about 20.

7. The golf ball of claim 1, wherein the barrier layer has a pencil hardness of about 5B to about F.

8. The golf ball of claim 1, wherein the binder comprises one or more of styrene-olefin block copolymers, poly(styrene-co-maleic anhydride)s, acrylonitrile-butylene-styrene copolymers, poly(styrene sulfonate)s, polystyrenes, styrene-butadiene copolymers, acrylics, grafted or non-grafted metallocene-catalyzed polyolefins, balata, polyethylenes, chlorinated polyethylenes, polypropylenes, polybutylenes, butyl-based rubbers, isoprene rubbers, trans polyisoprenes, neoprenes, ethylene-propylene rubbers, ethylene-butylene rubbers, or ethylene-propylene-(non-conjugated diene) terpolymers.

9. The golf ball of claim 1, wherein the binder comprises at least one styrene-olefin block copolymer.

10. The golf ball of claim 1, wherein the microparticles comprise leafing or non-leafing flakes of aluminum, iron oxide, copper, or bronze.

11. The golf ball of claim 1, wherein the microparticles comprise leafing flakes of aluminum oxide.

12. The golf ball of claim 1, wherein the composition further comprises one or more of polymeric polyahls, compatibilizers, coupling agents, cross-linking agents, polyolefin polyols, tertiary amines, or silanes.

13. The golf ball of claim 12, wherein the composition comprises a polyolefin comprising at least one hydrogenated polybutadiene polyol.

14. The golf ball of claim 12, wherein the composition comprises at least one coupling agent that bonds the barrier layer to the cover.

15. The golf ball of claim 1, wherein the composition is dispersed in a non-aqueous solvent system comprising aromatic hydrocarbons, ketones, acetates, alcohols, or esters prior to forming the barrier layer.

16. The golf ball of claim 15, wherein the solvent-borne dispersion has a solid content of at least about 30%.

17. The golf ball of claim 15, wherein the solvent-borne dispersion has a viscosity of about 700 cps to about 900 cps.

18. The golf ball of claim 1, wherein the barrier layer is formed by spraying and/or dipping.

19. A golf ball comprising a core, a barrier layer enveloping the core, and a cover enveloping the barrier layer, wherein the barrier layer has a moisture vapor transmission rate less than that of the cover, and the barrier layer comprises a thermoplastic or thermoset composition of microparticles dispersed in a binder comprising synthetic rubbers, natural rubbers, polyolefins, styrenic polymers, or single-site catalyzed polymers, and the microparticles have a particle size of about 4 microns to about 335 microns.

20. The golf ball of claim 19, wherein the microparticles comprises leafing metal flakes.

21. The golf ball of claim 19, wherein the barrier layer has a thickness of about 0.001 inches to about 0.01 inches.

22. The golf ball of claim 21, wherein the barrier layer has a thickness of about 0.002 inches to about 0.007 inches.

23. The golf ball of claim 19, wherein the particle size is about 8 microns to about 50 microns.

24. The golf ball of claim 19, wherein the composition has a particle-to-binder ratio of about 0.5 to about 2.5.

25. A golf ball comprising a core, a barrier layer enveloping the core, and a cover enveloping the barrier layer, wherein the barrier layer comprises a thermoplastic or thermoset composition of microparticles dispersed in a binder comprising synthetic rubbers, natural rubbers, polyolefins, styrenic polymers, or single-site catalyzed polymers, and the barrier layer has a moisture vapor transmission rate of less than about 0.95 grams·mm/(m²·day) and less than that of the cover.

26. The golf ball of claim 25, wherein the barrier layer has a moisture vapor transmission rate of less than about 0.65 grams·mm/(m²·day).

27. A golf ball comprising a core, a barrier layer enveloping the core, and a cover enveloping the barrier layer, wherein:
the barrier layer has a moisture vapor transmission rate less than that of the cover; and
the barrier layer comprises aluminum flakes comprising aluminum oxide.

28. The golf ball of claim 27, wherein the barrier layer further comprises a styrene-olefin block polymer, a polyolefin polyol, a tertiary amine, and a silane, and wherein the flakes are leafing flakes.

29. The golf ball of claim 27, wherein the composition has a particle-to-binder ratio of about 0.5 to about 2.5.

30. A golf ball comprising:
a core having a diameter of at least about 1.62 inches;
a barrier layer of less than about 0.02 inches thick enveloping the core, wherein the barrier layer comprises a thermoplastic or thermoset composition of microparticles dispersed in a binder; and
a cover of less than 0.03 inches thick enveloping the barrier layer, wherein the barrier layer has a moisture vapor transmission rate less than that of the cover.

31. The golf ball of claim 30, wherein the microparticles comprise aluminum flakes comprising aluminum oxide, and the binder comprises at least one styrenic polymer.

32. The golf ball of claim 30, wherein the composition further comprises a cross-linking agent, a catalyst, or a coupling agent.

33. The golf ball of claim 30, wherein the composition is dispersed in a non-aqueous solvent system comprising aromatic hydrocarbons, ketones, acetates, alcohols, or esters.

34. The golf ball of claim 30, wherein the composition has a particle-to-binder weight ratio of about 0.5 to about 2.5.

35. The golf ball of claim 30, wherein the barrier layer has a moisture vapor transmission rate of less than about 0.95 grams·mm/(m²·day).

36. The golf ball of claim 30, wherein the thickness of the barrier layer is about 0.002 inches to about 0.007 inches.

37. The golf ball of claim 30, wherein the core has:
a diameter of about 1.62 inches to about 1.64 inches;
a compression of less than about 100;
a deflection at 100 kg of greater than about 1.5 mm;
a coefficient of restitution of greater than about 0.78;
a specific gravity of less than about 1.4 g/cm³; and
a peripheral hardness greater than a central hardness by about 5 Shore C.

38. The golf ball of claim 30, wherein the core comprises:
a polybutadiene having a Mooney viscosity of greater than about 35;
a crosslinking agent in an amount of greater than about 15 parts per 100 parts by weight of the polybutadiene; and
an optional plasticizer.

39. The golf ball of claim 30, wherein the core comprises:
a center having a diameter of about 0.5 inches to about 1.6 inches, a compression of about 50 to about 300, a deflection at 100 kg of greater than about 1.5 mm; and
an outer core layer enveloping the center.

40. The golf ball of claim 39, wherein the center comprises:
a polybutadiene having a Mooney viscosity of greater than about 35;
a crosslinking agent in an amount of about 15 part to about 40 parts per 100 parts by weight of the polybutadiene;
a regrind or filler; and
an optional plasticizer.

41. The golf ball of claim 39, wherein the outer core layer comprises:
a polybutadiene having a Mooney viscosity of greater than about 35;
a crosslinking agent in an amount of about 25 part to about 55 parts per 100 parts by weight of the polybutadiene;
a regrind, polyisoprene, or filler; and
an optional plasticizer, wherein the outer core layer has a material hardness of greater than about 60 Shore C.

42. The golf ball of claim 30, wherein the cover has an outermost surface occupied by about 250 to about 450 dimples, and comprises:
- a composition formed from a thermoplastic polyurethane, a thermoset polyurethane, a thermoplastic polyurea, or a thermoset polyurea; and
- the composition having a material hardness of about 25 Shore D to about 65 Shore D and a flexural modulus of at least about 2,000 psi.

43. The golf ball of claim 30, wherein the golf ball has:
- a compression of less than about 110;
- a coefficient of restitution greater than about 0.79;
- a moment of inertia greater than about 84 g·cm$^2$; and
- a deflection at 100 kg of greater than about 1.5 mm.

44. A golf ball comprising a core, a barrier layer enveloping the core, and a cover enveloping the barrier layer, wherein the barrier layer has a moisture vapor transmission rate less than that of the cover, and the barrier layer comprises a thermoplastic or thermoset composition of microparticles dispersed in a binder comprising synthetic rubbers, natural rubbers, polyolefins, styrenic polymers, or single-site catalyzed polymers, wherein the barrier layer has a thickness of about 0.001 inches to 0.01 inches.

45. The golf ball of claim 44, wherein the barrier layer has a thickness of about 0.002 inches to about 0.007 inches.

46. The golf ball of claim 44, wherein the composition has a particle-to-binder ratio of about 0.5 to about 2.5.

47. A golf ball comprising a core, a barrier layer enveloping the core, and a cover enveloping the barrier layer, wherein the barrier layer has a moisture vapor transmission rate less than that of the cover, and the barrier layer comprises a thermoplastic or thermoset composition of microparticles dispersed in a binder comprising synthetic rubbers, natural rubbers, polyolefins, styrenic polymers, or single-site catalyzed polymers, and a difference in specific gravity between the core and the barrier layer is at least 0.1 g/cm$^3$.

48. The golf ball of claim 47, wherein the barrier layer has a specific gravity of about 1.2 g/cm$^3$ to about 1.5 g/cm$^3$.

* * * * *